United States Patent [19]

Newman

[11] Patent Number: 4,919,744

[45] Date of Patent: Apr. 24, 1990

[54] METHOD OF MAKING A FLEXIBLE HEATER COMPRISING A CONDUCTIVE POLYMER

[75] Inventor: Keith G. Newman, Sunnyvale, Calif.

[73] Assignee: Raychem Corporation, Menlo Park,, Calif.

[21] Appl. No.: 252,237

[22] Filed: Sep. 30, 1988

[51] Int. Cl.[5] .............................................. B32B 31/20

[52] U.S. Cl. .................................... 156/308.2; 29/611; 156/87; 156/292; 156/300; 156/309.6; 219/529; 252/511

[58] Field of Search ...................... 156/87, 292, 308.2, 156/309.6, 300; 252/511; 219/529; 29/611

[56] References Cited

U.S. PATENT DOCUMENTS

| | | | |
|---|---|---|---|
| 4,177,376 | 12/1979 | Horsma et al. | 219/553 |
| 4,177,446 | 12/1979 | Diaz | 338/212 |
| 4,223,209 | 9/1980 | Diaz | 219/549 |
| 4,304,987 | 12/1981 | van Konynenburg | 219/553 |
| 4,317,027 | 2/1982 | Middleman et al. | 219/553 |
| 4,318,220 | 3/1982 | Diaz | 29/611 |
| 4,330,703 | 5/1982 | Horsma et al. | 219/553 |
| 4,426,633 | 1/1984 | Taylor | 338/25 |
| 4,543,474 | 9/1985 | Horsma et al. | 219/553 |
| 4,654,511 | 3/1987 | Horsma et al. | 219/548 |
| 4,689,475 | 8/1987 | Matthiesen | 219/553 |
| 4,719,335 | 1/1988 | Batliwalla et al. | 219/528 |
| 4,761,541 | 8/1988 | Batliwalla et al. | 219/528 |
| 4,777,351 | 10/1988 | Batliwalla et al. | 219/528 |
| 4,800,253 | 1/1989 | Kleiner | 219/553 |

OTHER PUBLICATIONS

U.S. Patent Application No. 07/189,938, Kevin J. Friel, filed May 3, 1988.

U.S. Patent Application No. 07/247,059, Shafe et al., filed Sep. 20, 1988.

U.S. Patent Application No. 07/247,026, Shafe et al., filed Sep. 20, 1988.

U.S. Patent Application No. 07/252,229, Andrew N-S. Au, filed Sep. 30, 1988.

*Primary Examiner*—John J. Gallagher
*Attorney, Agent, or Firm*—Marguerite E. Gerstner; Timothy H. P. Richardson; Herbert G. Burkard

[57] ABSTRACT

A flexible and rugged laminar heater in which a nonwoven cloth layer serves to reduce air void formation during lmaination. The heater of the invention comprises a laminar conductive polymer heating element, at least two electrodes, at least one polymeric insulating layer and at least one nonwoven cloth layer. Suitable nonwoven cloths may comprise nylon or glass. In addition to eliminating air voids, they are useful in minimizing distortion of the laminate.

14 Claims, 1 Drawing Sheet

METHOD OF MAKING A FLEXIBLE HEATER COMPRISING A CONDUCTIVE POLYMER

BACKGROUND OF THE INVENTION

Field of the Invention

This invention relates to flexible heaters comprising conductive polymers and methods of making said heaters.

BACKGROUND OF THE INVENTION

Laminar heaters for surface heating are known. For many applications it is important that the heater be flexible in order to provide good thermal contact to nonlaminar and/or nonuniform surfaces. In order to rapidly and efficiently heat the substrate, the heater often must be capable of generating and sustaining a high thermal output. In addition, it is also frequently desirable that the heater be rugged.

Of particular interest and heaters in which the laminar heating element comprises a conductive polymer, especially a conductive polymer which exhibits PTC (positive temperature coefficient of resistance) behavior. Conductive polymer compositions and electrical devices such as heaters comprising them are well-known. Reference may be made, for example, to U.S. Pat. Nos. 4,177,376, 4,304,987, 4,317,027, 4,330,703, 4,388,607, 4,514,620, 4,534,889, 4,543,474, 4,654,511, 4,719,335, and 4,761,541, and copending, commonly assigned application Ser. Nos. 53,610 filed May 20, 1987 (Batliwalla, et al.), now U.S. Pat. No. 4,777,351, 83,093 filed Aug. 25, 1987 (Kleiner et al.), now U.S. Pat. No. 4,800,253, 189,938 (Friel) filed May 3, 1988, 202,762 (Sherman, et al.) filed June 3, 1988, 247,059 (MP1271, Shafe et al.) filed Sept. 20, 1988, and 247,026 (MP1272, Shafe et al.) filed Sept. 20, 1988, and 252,229 (MP1263, Au) filed contemporaneously with this application, the disclosures of which are incorporated herein by reference.

The combination of ruggedness and good thermal transfer is often achieved by means of a multilayer design in which a laminar heating element, electrodes, insulation, and other layers, e.g. layers of thermally conductive material or adhesives, are laminated together. Although the multilayer design contributes to ruggedness, it usually increases the thickness of the heater, decreasing the flexibility. In addition, differential thermal expansion between the materials comprising the different layers may result in void formation and/or curling of the layers during the lamination process. The voids decrease the moisture barrier properties of the heater, and the distortion caused by the curling makes it difficult to silkscreen or etch electrode layers or apply insulation which has adequate electrical properties and aesthetic appearance. These problems are particularly severe when the heating element comprises a conductive polymer which expands when heated. Adequate bonding of electrodes and/or insulation layers is achieved only when the lamination temperature is near the melting point of the polymer. When the polymer cools and contracts, air voids are formed. Such air entrapment is observed in laminar devices and heaters which comprise solid metal electrodes, such as those disclosed in U.S. Pat. Nos. 4,426,633 (Taylor) and 4,689,475 (Matthiesen).

SUMMARY OF THE INVENTION

I have now discovered that an improved heater composed of a laminate of multiple layers can be produced when at least one layer comprises a nonwoven cloth. The nonwoven cloth serves to eliminate air voids and minimize distortion of the laminate, producing a heater which is flexible, rugged, tear and moisture resistant, and capable of uniform thermal output. Thus in one aspect, the invention provides a heater which comprises (1) a laminar heating element which exhibits PTC behavior and which comprises a conductive polymer composition which is composed of a polymeric component and, dispersed in the polymeric component, a particulate conductive filler;
(2) at least two electrodes which can be connected to a source of electrical power to cause current to flow through the heating element and which are positioned so that when current passes between the electrodes a substantial proportion of the current through the laminar element is parallel to the faces of the laminar element;
(3) at least one polymeric insulating layer; and
(4) at least one layer which comprises a nonwoven cloth wherein the nonwoven cloth is laminated to at least one insulating layer and serves to reduce air void formation during lamination.

In a second aspect, the invention provides a method of laminating layers in a laminate structure comprising a laminar heating element which comprises a conductive polymer, said method comprising (1) positioning a layer of nonwoven cloth between (i) a first layer which (a) comprises a laminar heating element which exhibits PTC behavior and which comprises a conductive polymer composition and (b) comprises at least two electrodes which are positioned so that when current passes between the electrodes a substantial proportion of the current through the laminar element is parallel to the faces of the laminar element and (ii) a second layer which comprises a polymeric insulating material; and
(2) exposing the layers to sufficient temperature and pressure to achieve a bond between the layers.

Electrical devices prepared by this method are particularly useful in heating pouches of food, such as military rations or baby food.

DETAILED DESCRIPTION OF THE INVENTION

Figure 1:
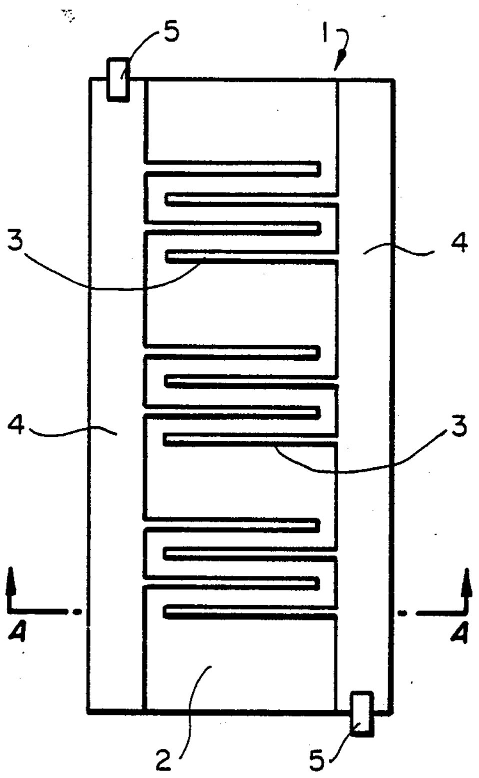
FIG. 1 is a plan view of an electrical device of the invention.

The electrical devices of the invention have a laminate structure, i.e. they comprise two or more laminar layers bonded together. In the most simple configuration, the laminate structure comprises an insulating layer which covers or surrounds a laminar heating element comprising a conductive polymer composition and two electrodes. More common configurations include those in which there are several laminar layers for electrical insulation, thermal dissipation, electrical fault detection, stress relief, or reinforcement. The use of nonwoven cloth disclosed in this invention may be advantageous in bonding any two of these layers together. The resulting electrical device may comprise several interface layers of nonwoven cloth; each layer may comprise a different type of cloth. Although many of the layers in the laminate structure are electrically insulating, the nonwoven cloth may also be used to bond two electrically conductive layers such as a PTC layer to a ZTC layer or an insulating layer and a conductive layer.

The cloth useful in this invention is nonwoven, i.e. a textile made directly from fibers which are held together by fiber entanglements or by bonding agents. The structure of the nonwoven cloth tends to be open, allowing significant permeability of air when measured by ASTM Test D-737. While both woven and unwoven cloths are effective in eliminating bubbles, woven cloths tend to be too thick, resulting in poor bonding between layers of the laminate. Thick nonwoven cloths or nonwoven cloths which are too closely knit also create poor bonds. Preferred nonwoven cloths are those which have a thickness of less than 0.015 inch (0.038 cm), preferably less than 0.010 inch (0.025 cm), particularly less than 0.008 inch (0.020 cm), e.g. about 0.001 to 0.005 inch (0.003 to 0.008 cm). The nonwoven cloth may be made of any suitable material, e.g. polyester (particularly poly(ethylene terephthalate)), nylon (particularly type 6 or 6,6), polypropylene, poly(vinyl alcohol), glass, carbon, ceramic, and natural fibers. The cloth may be manufactured by any suitable means, e.g. it may be spunbonded, spunlace bonded, or needled, from any suitable type of fiber, e.g. staple or long fiber. A bonding agent may be used, although for many applications it is preferred that a cloth with no bonding agent is used in order to avoid melting the bonding agent at the lamination or heater operation temperatures, thus weakening the bond.

The exact type of nonwoven cloth selected depends on its function in the heater. Two functions are of particular interest: use as a reinforcing layer and use as a bleed cloth to eliminate air bubbles. Nonwoven cloths used as reinforcing layers serve to prevent the laminate from curling and distorting and generally have a thickness of 0.001 to 0.015 inch, preferably 0.002 to 0.008 inch. Materials with relatively high melting points are preferred in order to avoid significant expansion of the cloth during the lamination step. For this reason, nonwoven cloths comprising glass or carbon fibers are preferred, glass being particularly preferred when there is the requirement that the cloth be electrically nonconductive. When the cloth is laminated to a conductive polymer substrate which has a metal layer attached to its opposite surface, cloths with a thickness of 0.001 to 0.010 inch, particularly 0.002 to 0.007 inch, are preferred. Cloths useful as reinforcing interface layers generally have a weight of 0.4 to 2.0 oz/yd$^2$, preferably 0.6 to 1.5 oz/yd$^2$, although the weight is only one factor to be considered along with the thickness and permeability of the cloth.

The cloths which act primarily to bleed out air are generally thinner, lighter weight, more permeable and more flexible than reinforcing cloths. In general, useful cloths are those with a thickness of 0.0005 to 0.010 inch (0.001 to 0.025 cm), preferably 0.001 to 0.008 inch (0.003 to 0.020 cm), particularly 0.002 to 0.005 inch (0.005 to 0.013 cm). In order to displace the maximum amount of air, it is desirable that the polymer layers of the laminate melt and flow through the interface cloth. Thus, most preferred are cloths which have a random distribution of fibers and which have a high permeability. Suitable cloths are those which, when measured under ASTM D-737, have an air permeability of at least 500 CFM/ft$^2$, preferably at least 1000 CFM/ft$^2$, particularly at least 1500 CFM/ft$^2$. Such cloths preferably are relatively light weight, i.e. less than 1.0 oz/yd$^2$, preferably less than 0.7 oz/yd$^2$, particularly less than 0.5 oz/yd$^2$. Cloths which are particularly useful due to their light weight, permeability, and resistance to tearing comprise Nylon 6,6 or polyester.

For both functions, cloths which have a random distribution of fibers with large open areas rather than a uniform or oriented alignment of fibers and/or uniform arrangement of open area are preferred. The open area allows polymeric material to flow through the cloth eliminating air bubbles and the random distribution of fibers reduces the tendency to tear, resulting in a strong bond. In addition, when there is sufficient open area for the polymer material to flow into the interface cloth, the cloth becomes "part" of the polymeric layer and its thickness becomes negligible. For some applications, it is preferred that the interface cloth comprise fibers which protrude from the surface, providing sites for adhesion of another material such as a polymer or paint.

It is preferred that the temperature of lamination be less than the melting point $T_{mc}$ of the cloth, and particularly less than the glass transition temperature $T_g$ of the cloth in order to avoid significant expansion or melting of the cloth and subsequent weakness of the bond. (The melting point is defined as the peak temperature of the curve measured with a differential scanning calorimeter (DSC) on the material comprising the cloth. The glass transition temperature is defined as the temperature below the melting point at which there is a change in the slope of the curve of volume as a function of temperature.) When the cloth is laminated between two polymeric layers, it may be desirable to select a cloth which has a similar expansion characteristic to that of the polymeric layers in order to produce the strongest bond. When the function of the cloth is as a reinforcing layer, e.g. when it is laminated to the opposite side of a conductive polymer substrate which is bonded to a metal layer, it is preferred that the thermal expansion coefficient be intermediate to that of the polymer and the metal layers.

The conductive polymer compositions used in the laminar heating element may exhibit PTC (positive temperature coefficient) behavior or ZTC (zero temperature coefficient) behavior in the temperature range of interest when connected to a source of electrical power. In some configurations the nonwoven cloth may be used to bond a layer comprising a PTC composition to a layer comprising a ZTC composition or a first layer comprising a first PTC composition to a second layer comprising a second PTC composition. The terms "PTC behavior" and "composition exhibiting PTC behavior" are used in this specification to denote a composition which has an $R_{14}$ value of at least 2.5 or an $R_{100}$ value of at least 10, and preferably both, and particularly one which has an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. In contrast, "ZTC behavior" is used to denote a composition which increases in resistivity by less than 6 times, preferably less than 2 times, in any 30° C. temperature range within the operating range of the heater.

The conductive polymer composition comprises an organic polymer (such term being used to include siloxanes), preferably a crystalline organic polymer. Suitable crystalline polymers include polymers of one or more olefins such as polyethylene; copolymers of at least one olefin and at least one monomer copolymerisable therewith such as ethylene/vinyl acrylic acid, ethylene/ethyl acrylate, and ethylene/vinyl acetate copolymers; fluoropolymers such as polyvinylidene fluoride and ethylene/tetrafluoroethylene copolymers; and blends of two or more such polymers. For some applications it may be desirable to blend one polymer with another polymer in order to achieve specific physical or thermal properties.

The particulate conductive filler may be carbon black, graphite, metal, metal oxide, or a combination of these. Alternatively, the conductive filler may itself comprise a conductive polymer. Such materials are described in copending commonly assigned U.S. application Ser. Nos. 818,846 filed Jan. 14, 1985 (Barma), now abandoned, and 75,929 filed July 21, 1987 (Barma, et al.) and the International Application No. US88/02484 filed July 21, 1988 (Barma, et al.), published on Jan. 26, 1989 as International Publication No. WO8900755, the disclosures of which are incorporated herein by reference.

The conductive polymer composition may also comprise inert fillers, antioxidants, flame retardants, prorads, stabilizers, dispersing agents, or other components. Mixing may be conducted by any suitable method, e.g. solvent blending or melt-mixing. The composition may be crosslinked by irradiation or chemical means.

The laminar heating element may be prepared by extruding or otherwise shaping the conductive polymer composition. Alternatively, the composition may be applied in the form of an ink or a paste onto a suitable substrate by silkscreening, painting, or another method.

Appropriate electrodes, suitable for connection to a source of electrical power, may comprise metal wires or braid, metal sheet, metal mesh, conductive paint (e.g., metal- or carbon-filled), or any other suitable material. When the electrode comprises a metal sheet, electrodeposited metals, e.g. copper or nickel, such as those disclosed in U.S. Pat. No. 4,689,475 and copending commonly assigned Ser. No. 83,093 filed Aug. 25, 1987 (Kleiner et al.), now U.S. Pat. No. 4,800,253, are preferred. The electrodes may be attached to the surface of the heating element or embedded into it, either directly or by means of a conductive adhesive. Complex electrode patterns such as the inter-digitated electrodes disclosed in U.S. Pat. Nos. 4,719,335 and 4,761,541 and application Ser. No. 53,610 filed May 20, 1987, now U.S. Pat. No. 4,777,351 (all Batliwalla, et al) or the serpentine electrode disclosed in application Ser. No. 189,938 filed May 3, 1988 (Friel) may be preferred when different thermal output in different sections of the heater is desired. It is particularly preferred that the electrodes be positioned on one surface of the heating element such that when current passes between the electrodes a substantial proportion of the current through the laminar element is parallel to the faces of the laminar element. For applications where the heater must be folded around an object, e.g. a food pouch, to heat it, discrete electrode patterns can be applied at intervals to maximize the heating efficiency in the regions in contact with the object. This is especially useful when a single conductive polymer substrate must be folded in a serpentine shape in order to contact and heat multiple objects. In this type of heater, it is desirable that the electrodes are connected by busbars that are continuous from one discrete electrode pattern to the next. The busbars may comprise the same material as the electrodes or they may be different.

The heating element is frequently covered with a dielectric layer for electrical insulation and environmental protection. Other layers which may be part of the laminate structure comprising the heating element include strain relief layers, thermally conductive layers and fault detection film. For ease of fabrication, these layers may be laminated together in a single step or in sequential steps. One or more interface layers may be used to improve the bonding between the layers. The choice of lamination time, temperature, and pressure is dependent on the type and number of layers being laminated.

The invention is illustrated in the drawing in which FIG. 1 is a plan view of an electrical device 1 of the invention. Three discrete heating regions are present in which electrodes 3 are attached to a conductive polymer sheet 2. Electrical connection is made to each electrode and from one discrete region to the next by means of busbars 4. Crimps 5 serve to allow connection to a source of electrical power. The device is shown without the surface insulation layer and a metallic fault detector plane which is positioned on the surface of the device between the busbars 4 but is electrically insulated from the conductive polymer sheet. Connection to this fault detector plane is made by means of a crimp which does not contact the conductive polymer sheet.

Figure 2:
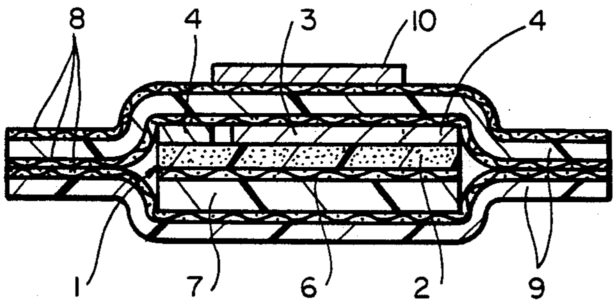
FIG. 2 is a cross-sectional view along line A—A of FIG. 1 of an electrical device of the invention.

FIG. 2 is a cross-sectional view of the laminate structure of the electrical device 1 along line A—A of FIG. 1 and includes the surface insulation and metallic fault detector plane. The conductive polymer sheet 2 is laminated on the top surface with electrode 3 and busbars 4 and on the other surface with a reinforcing nonwoven cloth layer 6. The bottom surface is jacketed with a polymeric inner jacket 7, a nonwoven bleed cloth layer 8 and a polymeric outer jacket 9. The top surface is jacketed by sequential layers of nonwoven bleed cloth 8, polymeric outer jacket 9, nonwoven bleed cloth 8, and metallic fault detection plane 10.

The invention is illustrated by the following example in which four nonwoven cloth layers are used.

Conductive polymer pellets wee made by mixing 55 wt% ethylene/acrylic acid copolymer (Primacor 1320, available from Dow Chemicals) with 45 wt% carbon black (Statex G, available from Columbian Chemicals) in a Farrell continuous mixer. The pellets were extruded through a tube die to produce a tube approximately 2 inches (5.1 cm) in diameter. The tube was cooled, then slit and the resulting sheet was run through rollers to produce a sheet about 6.25 inches (16.0 cm) wide and 0.010 inch (0.25 cm) thick.

After trimming the conductive polymer sheet to a width of 4 inches (10.2 cm), a single operation was used to laminate the conductive polymer sheet on one side with a 0.001 inch (0.002 cm) thick zinc-nickel passivated electro-deposited copper foil (Tex-1 from Yates) and on the opposite surface with a first layer of 0.005 inch (0.013 cm) thick nonwoven glass (Manniglas 1200, available from Lydall) and a first layer of 0.005 inch (0.013 cm) thick ethylene/acrylic acid copolymer (Primacor 1320). Following pumice grinding of the copper foil surface, an interdigitated electrode pattern was silk-screen printed at finite intervals conforming to heating zones on the copper foil with an acid resist ink (PR4001 available from Hysol). The exposed copper was then etched with a $FeCl_3$ solution to leave a pattern of discrete heating segments connected by continuous busbars.

The laminate was jacketed on the bottom surface by attaching a layer of 0.003 inch (0.008 cm) thick nonwoven nylon cloth (Cerex 0.2 Type 23 from James River) and a second 0.005 inch (0.013 cm) layer of ethylene acrylic acid. The copper surface was jacketed by attaching a first layer of nonwoven nylon cloth, a 0.010 inch (0.025 cm) thick layer of ethylene acrylic acid, and a second layer of nonwoven nylon cloth. A metallic fault detector plane comprising a metallized polyester film (Scotchpak #20 from 3M) was heat-sealed to the exposed nonwoven nylon cloth on the top surface to cover the 2.5 inch (6.35 cm) width of the interdigitated electrode. Crimp connectors were applied in contact with the electrodes at opposite ends of the heater and a third crimp connector was attached to the metallic fault detector plane. The resulting electrical device was approximately 41.3 inches (104.9 cm) long and 5 inches (12.7 cm) wide and consisted of five heating zones (each approximately 6 inches (15.24 cm) long by 3 inches (7.62 cm) wide) separated by 2.5 inch (6.35 cm) long bend relief regions.

What is claimed is:

1. A method of laminating layers to form a heater comprising a conductive polymer heating element, said method comprising (A) positioning a layer of nonwoven cloth between (1) a first layer which (a) comprises a laminar heating element which exhibits PTC behavior and which comprises a conductive polymer composition and (b) further comprises at least two electrodes which are positioned so that when current passes between the electrodes a substantial proportion of the current through the laminar element is parallel to the faces of the laminar element and (2) a second layer which comprises a polymeric insulating material; and (B) exposing the layers to sufficient temperature and pressure to achieve a bond between the layers.

2. A method according to claim 1 wherein the temperature of lamination is less than the melting point of the nonwoven cloth.

3. A method according to claim 1 wherein the first layer further comprises a layer of polymeric insulating material.

4. A method according to claim 1 wherein the electrodes are positioned on the same surface of the laminar heating element and the nonwoven cloth is adjacent to the electrodes.

5. A method according to claim 3 wherein the nonwoven cloth is in contact with two insulating layers.

6. A method according to claim 1 wherein the nonwoven cloth comprises nylon.

7. A method according to claim 1 wherein the nonwoven cloth comprises glass.

8. A method according to claim 1 wherein the electrodes comprise electrodeposited metal.

9. A method according to claim 1 wherein the nonwoven cloth has a thickness of less than 0.015 inch.

10. A method according to claim 6 wherein the nonwoven cloth has a thickness of 0.005 to 0.010 inch.

11. A method according to claim 7 wherein the nonwoven cloth has a thickness of 0.001 to 0.015 inch.

12. A method according to claim 6 wherein the nonwoven cloth has a weight of 0.005 to 1.0 oz/yd$^2$.

13. A method according to claim 7 wherein the nonwoven cloth has a weight of 0.4 to 0.2 oz/yd$^2$.

14. A method according to claim 1 wherein the nonwoven cloth has a permeability to air of at least 500 CFM/ft$^2$.

* * * * *